United States Patent
Park et al.

(10) Patent No.: US 10,243,233 B2
(45) Date of Patent: Mar. 26, 2019

(54) SWELLING TAPE FOR FILLING GAP

(71) Applicant: LG Chem, Ltd., Seoul (KR)

(72) Inventors: Min Soo Park, Daejeon (KR); Byung Kyu Jung, Daejeon (KR); Yoon Tae Hwang, Daejeon (KR); Se Woo Yang, Daejeon (KR); Suk Ky Chang, Daejeon (KR); Sung Jong Kim, Daejeon (KR); Ji Young Hwang, Daejeon (KR); Cha Hun Ku, Daejeon (KR)

(73) Assignee: LG Chem, Ltd. (KR)

( * ) Notice: Subject to any disclaimer, the term of this patent is extended or adjusted under 35 U.S.C. 154(b) by 481 days.

(21) Appl. No.: 14/443,268

(22) PCT Filed: Nov. 18, 2013

(86) PCT No.: PCT/KR2013/010475
§ 371 (c)(1),
(2) Date: May 15, 2015

(87) PCT Pub. No.: WO2014/077649
PCT Pub. Date: May 22, 2014

(65) Prior Publication Data
US 2015/0307752 A1    Oct. 29, 2015

(30) Foreign Application Priority Data

Nov. 16, 2012 (KR) .................. 10-2012-0130478
Nov. 18, 2013 (KR) .................. 10-2013-0140175

(51) Int. Cl.
*H01M 10/04* (2006.01)
*H01M 10/052* (2010.01)
*H01M 10/0587* (2010.01)
*H01M 2/10* (2006.01)
(Continued)

(52) U.S. Cl.
CPC .... *H01M 10/0422* (2013.01); *C08G 18/3206* (2013.01); *C08G 18/42* (2013.01);
(Continued)

(58) Field of Classification Search
None
See application file for complete search history.

(56) References Cited

U.S. PATENT DOCUMENTS 5,059,269 A * 10/1991 Hu .................. A61L 33/068
                                                156/244.11
6,083,211 A    7/2000 DesMarais
(Continued)

FOREIGN PATENT DOCUMENTS

CN    101331200 A    12/2008
DE    102009052044 B3    5/2011
(Continued)

OTHER PUBLICATIONS

Taiwanese Office Action and Search Report for Application No. 102141887 dated Dec. 22, 2014.
(Continued)

*Primary Examiner* — Barbara L Gilliam
*Assistant Examiner* — Zhongqing Wei
(74) *Attorney, Agent, or Firm* — Lerner, David, Littenberg, Krumholz & Mentlik, LLP

(57) ABSTRACT

The present invention relates to swelling tape for filling a gap and its use. The swelling tape is, for example, applied between gaps in which a fluid is present, thereby being deformed into a three-dimensional shape to fill the gap and fix an object separated by gaps as needed.

10 Claims, 2 Drawing Sheets

(51) Int. Cl.

| | |
|---|---|
| *H01M 2/16* | (2006.01) |
| *H01M 2/14* | (2006.01) |
| *C08G 18/66* | (2006.01) |
| *C08G 18/76* | (2006.01) |
| *C08G 18/32* | (2006.01) |
| *C08G 18/42* | (2006.01) |
| *C09J 133/08* | (2006.01) |
| *C09J 133/10* | (2006.01) |
| *C09J 7/22* | (2018.01) |
| *C09J 7/25* | (2018.01) |

(52) U.S. Cl.
CPC ......... *C08G 18/664* (2013.01); *C08G 18/76* (2013.01); *C08G 18/7621* (2013.01); *C08G 18/7671* (2013.01); *C09J 7/22* (2018.01); *C09J 7/25* (2018.01); *C09J 133/08* (2013.01); *C09J 133/10* (2013.01); *H01M 2/10* (2013.01); *H01M 2/14* (2013.01); *H01M 2/1653* (2013.01); *H01M 10/0431* (2013.01); *H01M 10/052* (2013.01); *H01M 10/0587* (2013.01); *C08G 2170/40* (2013.01); *C09J 2201/122* (2013.01); *C09J 2201/606* (2013.01); *C09J 2201/622* (2013.01); *C09J 2203/33* (2013.01); *C09J 2421/00* (2013.01); *C09J 2433/00* (2013.01); *C09J 2463/00* (2013.01); *C09J 2475/00* (2013.01); *C09J 2475/006* (2013.01); *C09J 2483/00* (2013.01)

(56) References Cited

U.S. PATENT DOCUMENTS

| | | | |
|---|---|---|---|
| 6,350,512 | B1 | 2/2002 | Hurley et al. |
| 2011/0007345 | A1 | 1/2011 | Varga et al. |
| 2012/0040776 | A1* | 2/2012 | Kim .................. A63B 37/0003 473/371 |
| 2012/0220913 | A1 | 8/2012 | Kosthorst et al. |
| 2013/0280570 | A1 | 10/2013 | Kim et al. |

FOREIGN PATENT DOCUMENTS

| | | | | |
|---|---|---|---|---|
| EP | 1189243 | A2 | 3/2002 | |
| EP | 1507299 | A2 | 2/2005 | |
| EP | 2657310 | A2 * | 10/2013 | ............. H01M 2/10 |
| JP | 2002506889 | A | 3/2002 | |
| JP | 2003151634 | A | 5/2003 | |
| JP | 2007262320 | A | 10/2007 | |
| JP | 2009519365 | A | 5/2009 | |
| JP | 2009519365 | A * | 5/2009 | ............... C08J 5/18 |
| KR | 20110022001 | A | 3/2011 | |
| KR | 20120087105 | A | 8/2012 | |
| KR | 20120087106 | A | 8/2012 | |
| KR | 1020120087106 | A * | 8/2012 | ............... C09J 7/02 |
| WO | 2007068596 | A1 | 6/2007 | |
| WO | 2007068598 | A2 | 6/2007 | |
| WO | 2009149036 | A1 | 12/2009 | |

OTHER PUBLICATIONS

International Search Report for Application No. PCT/KR2013/010475 dated Feb. 18, 2014.

Office Action from Chinese Patent Application No. 201380059402.2, dated Jul. 27, 2016.

Extended Search Report from European Application No. 13854724.5, dated Jun. 7, 2016.

* cited by examiner

[FIG. 1]
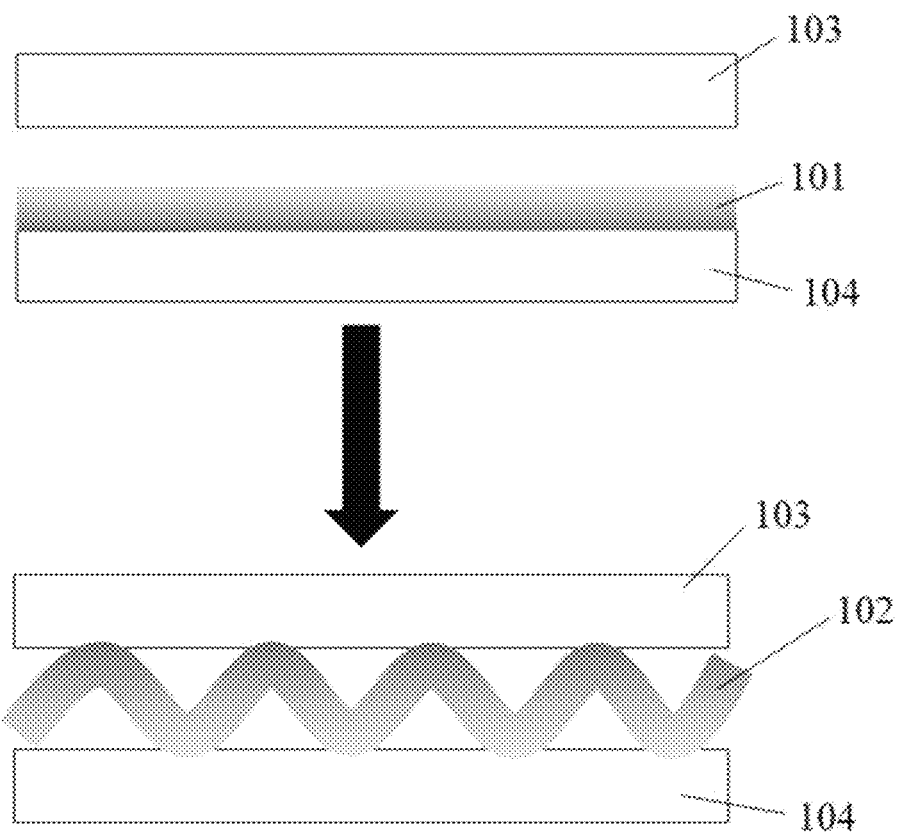
[FIG. 2]
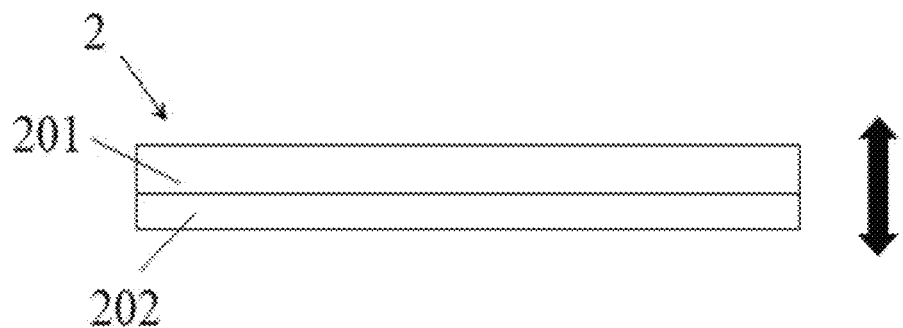

[FIG. 3]
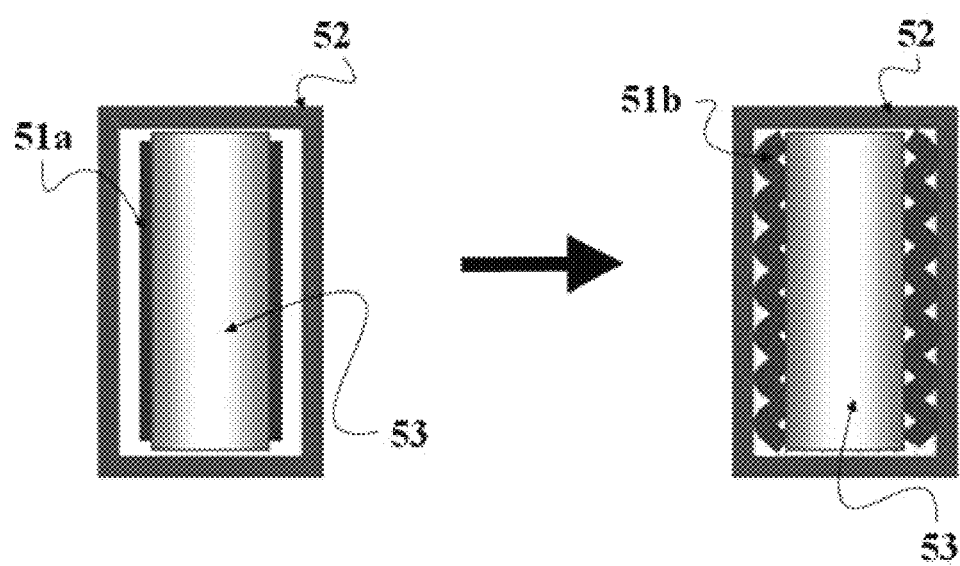

SWELLING TAPE FOR FILLING GAP

CROSS-REFERENCE TO RELATED APPLICATIONS

The present application is a national phase entry under 35 U.S.C. § 371 of International Application No. PCT/KR2013/010475 filed Nov. 18, 2013, which claims priority from Korean Application No. 10-2012-0130478 filed Nov. 16, 2012 and Korean Application No. 10-2013-0140175 filed Nov. 18, 2013, all of which are hereby incorporated herein by reference.

TECHNICAL FIELD

The present application relates to a swelling tape for filling a gap and its use.

BACKGROUND ART

In many cases, the need arises to fill a gap between two separated objects, and the two objects having the gap should be fixed in place by filling the gap.

For example, when a battery is manufactured by encasing an electrode assembly in a cylindrical can, the electrode assembly usually has a smaller size than the cylindrical can, so there is a gap between the electrode assembly and an inner wall of the can. In this case, the electrode assembly encased in the can is free to move therein in response to external vibration or impact, which may increase internal resistance of the battery or damage an electrode tab, considerably degrading battery performance. For this reason, the gap should be filled and the electrode assembly should be securely fixed in place.

DISCLOSURE

Technical Problem

The present application provides a swelling tape for filling a gap and its use.

Technical Solution

The present application relates to a swelling tape for filling a gap and its use. An example of the tape may include a substrate film and a pressure-sensitive adhesive layer formed on one surface of the substrate film. The term "swelling tape for filling a gap" used herein may refer to a tape serving to fill a gap between separated two objects, and to fix the two objects when needed.

As the substrate film, for example, a polyurethane film may be used. The polyurethane may include a reaction product of a mixture including an isocyanate compound having at least two isocyanate groups (hereinafter, referred to as a "polyisocyanate compound"), a polyol compound, and a chain extender.

The polyurethane includes all kinds of polymer compounds bound by a urethane bond. The polyurethane has a large molecular weight, and is prepared by forming a urethane (—NHCOO—) group by bonding an alcohol (—OH) group located at the end of polyol to an isocyanate (—NCO) group of a polyisocyanate compound, and reacting the isocyanate group with a chain extender to keep forming a urethane group again.

The polyisocyanate compound and the chain extender may participate in the reaction for forming a urethane group, thereby forming a hard region of the polyurethane. In this case, a weight ratio of the polyisocyanate compound and the chain extender is not particularly limited, but 15 to 60 parts by weight of the polyisocyanate compound may be mixed with 5 to 20 parts by weight of the chain extender.

In addition, the polyol serves to provide an OH group to the urethane bond as described above, and to form a soft region of the polyurethane.

Physical properties of a polyurethane film may be regulated by controlling a weight ratio of the hard region and the soft region within a suitable range. For example, in the polyurethane film, the sum of the weighs of the polyisocyanate compound and the chain extender composing the polyurethane film may be 20 to 300 parts by weight, 25 to 290 parts by weight or 30 to 280 parts by weight with respect to 100 parts by weight of the polyol compound. The unit "parts by weight" used herein may mean a weight ratio between components. As the weight ratio between the hard and soft regions of the polyurethane film is controlled, the physical property of the manufactured polyurethane film, for example, a hardness of the substrate film, can be maintained in the desired range, excellent supporting strength and resistance can be provided when a three-dimensional shape is implemented to fill a gap, and extension and deformation of the film when the tape is unwound can be prevented.

As the polyisocyanate compound, for example, an aromatic isocyanate compound, an alicyclic isocyanate compound, or an aliphatic isocyanate compound may be used.

As the aromatic isocyanate compound, for example, toluene diisocyanate, methylenediphenyldiisocyanate, bis(isocyanatobutyl)benzene, bis(isocyanatomethyl)naphthalene, bis(isocyanatomethyl)diphenylether, phenylenediisocyanate, ethylphenylenediisocyanate, isopropylphenylenediisocyanate, dimethylphenylenediisocyanate, diethylphenylenediisocyanate, diisopropylphenylenediisocyanate, trimethylbenzenetriisocyanate, benzenetriisocyanate, biphenyldiisocyanate, toluidine diisocyanate, 4,4-diphenylmethanediisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, hexahydrobenzenediisocyanate, or hexahydrodiphenylmethane-4,4-diisocyanate may be used, and suitably, toluene diisocyanate or methylenediphenyldiisocyanate may be used.

As the alicyclic isocyanate compound, for example, 1,2-bis(isocyanatomethyl)cyclohexane, 1,3-bis(isocyanatomethyl)cyclohexane, 1,4-bis(isocyanatomethyl)cyclohexane, cyclohexanediisocyanate, methylcyclohexanediisocyanate, dicyclohexyldimethylmethaneisocyanate, or 2,2-dimethyldicyclohexylmethaneisocyanate may be used, but the present invention is not limited thereto.

As the aliphatic isocyanate compound, for example, 2,2-dimethyl pentanediisocyanate, 2,2,4-trimethylhexanediisocyanate, butanediisocyanate, 1,3-butadiene-1,4-diisocyanate, 2,4,4-trimethylhexamethylenediisocyanate, 1,6,11-undecatriisocyanate, 1,3,6-hexamethylenetriisocyanate, 1,8-diisocyanate-4-isocyanatomethyloctane, bis(isocyanatoethyl)carbonate, bis(isocyanatoethyl)ether may be used, but the present invention is not limited thereto.

In addition, as the polyol compound, for example, the polyester polyol, polyester polyol, polycarbonate polyol, polycaprolactame polyol, polybutadiene polyol, polysulfide polyol, or a compound derived therefrom may be used, but suitably, polyester polyol or polyester polyol may be used.

The chain extender may be a compound having a low molecular weight having a hydroxyl group or an amine group. Unless particularly defined otherwise, the term "molecular weight" refers to a weight average molecular weight. The chain extender may play a key role to determine a shape of a final polymer, or flexibility, thermal resistance, and chemical resistance.

As the chain extender, for example, a bifunctional hydroxyl compound, a trifunctional hydroxyl compound, a tetrafunctional hydroxyl compound, or bifunctional amine compound may be used.

The bifunctional hydroxyl compound may be, for example, ethylene glycol, diethylene glycol, triethylene glycol, propylene glycol, dipropylene glycol, tripropylene glycol, 1,3-propanediol, 1,3-butanediol, neopentyl glycol, 1,6-hexanediol, 1,4-cyclohexanedimethaneol, hydroquinone bis (2-hydroxyethyl)ether, ethanolamine, diethanolamine, methyldiethanolamine, or phenyldiethanolamine. The trifunctional hydroxyl compound may be, for example, glycerol, trimethylpropane, 1,2,6-hexanetriol, or triethanolamine. The tetrafunctional hydroxyl compound may be, for example, pentaerythritol or N,N,N',N'-tetrakis(2-hydroxypropyl)ethylenediamine. The bifunctional amine compound may be, for example, diethyltoluenediamine or dimethylthiotoluenediamine. However, the present invention is not limited thereto.

The substrate film may be formed in a single layer structure of a polyurethane film, or a multilayer structure including at least a polyurethane film.

As the polyurethane film, a uniaxially- or biaxially-extended film, or a non-extended film may be used.

As the polyurethane film, for example, a thermoplastic polyurethane (TPU) film may be used.

As the TPU film, a polyester TPU film, a polyether TPU film, or a polycaprolactone TPU film is known, and among these films, a suitable one may be selected, but the polyester TPU film is preferably used.

The TPU film may suitably include an additive, for example, a crosslinking agent, a surfactant, a flame retardant, a blowing agent, a pigment, or a filler to obtain a desired effect as needed.

The substrate film may have a single layer structure of the TPU film, or a multilayer structure, for example, a double layer structure, including at least the TPU film.

When the substrate film includes an additional film, other than the TPU film, the additional film may be a polymer film or sheet, manufactured to be deformed, for example, to be expanded, in contact with a fluid under the conditions for extension or contraction during a manufacturing process.

In one example, the additional film may be a film including an ester or ether bond, or including a cellulose ester compound. For example, the additional film may be an acrylate-based film, an epoxy-based film, or a cellulose-based film, but the present invention is not limited thereto.

The substrate film included in the swelling tape for filling a gap may be, for example, a substrate film which can be deformed in a length direction in contact with a fluid. The substrate film may be expanded in a length direction in contact with a fluid. The term "length direction" used herein may refer to a direction perpendicular to a thickness direction (for example, an arrow direction of FIG. 2) of the substrate film when the substrate film is maintained flat. In addition, the terms "perpendicular" and "horizontal" used herein may refer to substantially perpendicular and substantially horizontal without damaging a desired effect, and permit an error within, for example, ±10, ±5, or ±3 degrees.

The substrate film may be any one capable of being deformed, for example, expanded in any direction such as a horizontal, vertical, or diagonal direction on a plane of the substrate film as long as it is deformed, for example, expanded in a length direction.

The shape of the substrate film may be, but is not particularly limited to, for example, a film or sheet shape. In addition, the film or sheet-type substrate film may have a square, circular, triangle, or amorphous shape.

In addition, the substrate film may be deformed, for example, expanded in a perpendicular direction, in addition to the length direction, when the film is in contact with a fluid. Accordingly, the substrate film may provide a swelling tape for filling a gap which is deformed into a three-dimensional shape having a height of, for example, 0.001 mm to 2.0 mm, 0.001 mm to 1.00 mm, or 0.01 mm to 0.5 mm in a direction perpendicular to the length direction when the film is in contact with a fluid.

The substrate film may have a shore A hardness of 70A or more, which is measured according to ASTM D2240. The substrate film may have a shore D hardness of 40D or more, which is measured according to JIS K-7311. As the hardness of the substrate film is maintained as described above, excellent supporting strength and resistance may be provided to fill a gap when a three-dimensional shape is implemented, and the extension and deformation of the film during the unwinding of the film can be prevented. The upper limit of the hardness of the substrate film is not particularly limited, but for example, the upper limit of the shore A hardness may be 100A or 95A, and the upper limit of the shore D hardness may be, for example, 100D or 85D.

A pressure-sensitive adhesive layer may be formed on one surface of the substrate film. The pressure-sensitive adhesive layer may be formed on one surface of the substrate film in a direction parallel to the length direction of the substrate film as described above. FIG. 2 is a cross-sectional diagram of a tape 2, which includes a pressure-sensitive adhesive layer (202) formed in a direction parallel to the length direction of a substrate film (201) on one surface of the substrate film (201).

The tape may be implemented in a three-dimensional shape projecting in a direction perpendicular to the length direction of the substrate film by expanding as the tape is fixed by the pressure-sensitive adhesive layer formed in a direction parallel to the length direction of the substrate film upon contact with a fluid.

As the pressure-sensitive adhesive layer, for example, an acryl pressure-sensitive adhesive, a urethane pressure-sensitive adhesive, an epoxy pressure-sensitive adhesive, a silicon pressure-sensitive adhesive, or a rubber-based pressure-sensitive adhesive may be used, but the present invention is not limited thereto.

In one example, the pressure-sensitive adhesive layer may be an acrylic pressure-sensitive adhesive layer including, for example, an acrylic polymer crosslinked by a multifunctional crosslinking agent.

As the acrylic polymer, for example, one having a weight average molecular weight ($M_w$) of 400,000 or more may be used. The weight average molecular weight is a conversion value with respect to standard polystyrene measured by a gel permeation chromatography (GPC). The upper limit of the molecular weight of the acrylic polymer may be, but is not particularly limited, controlled within a range of 2,500,000 or less.

The acrylic polymer may be included in a type in which a (meth)acrylic acid ester monomer and a copolymerizable monomer having a crosslinkable functional group are polymerized. Here, the weight ratio of the monomers is not particularly limited.

The (meth)acrylic acid ester monomer included in the polymer may be, but is not limited to, for example, alkyl (meth)acrylate, and in consideration of a cohesive strength, glass transition temperature, or pressure-sensitive adhesiveness of a pressure-sensitive adhesive, alkyl (meth)acrylate including an alkyl group having 1 to 14 carbon atoms may be used. Such a monomer, one or at least two of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth) acrylate, 2-ethylhexyl (meth)acrylate, 2-ethylbutyl (meth) acrylate, n-octyl (meth)acrylate, isooctyl (meth)acrylate, isononyl (meth)acrylate, lauryl (meth)acrylate, and tetradecyl (meth)acrylate may be used, but the present invention is not limited thereto.

A copolymerizable monomer having a crosslinkable functional group is a monomer, which may be copolymerized with another monomer included in the (meth)acrylic acid ester monomer or polymer, and may provide a crosslinking point that can react with a multifunctional crosslinking agent to a main chain of the polymer after being copolymerized. Here, the crosslinkable functional group may be a hydroxyl group, a carboxyl group, an isocyanate group, a glycidyl group, or an amide group, and in some cases, a photocrosslinkable functional group such as an acryloyl group or a methacryloyl group. The photocrosslinkable functional group may be introduced by reacting a compound having a photocrosslinkable functional group with a crosslinkable functional group provided by the copolymerizable monomer. In the field of manufacturing a pressure-sensitive adhesive, various copolymerizable monomers capable of being used according to desired functional groups are known. As an example of such a monomer, a monomer having a hydroxyl group such as 2-hydroxyethyl (meth) acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, or 2-hyroxypropyleneglycol (meth)acrylate; a monomer having a carboxyl group such as (meth)acrylic acid, 2-(meth)acryloyloxy acetic acid, 3-(meth)acryloyloxy propylic acid, 4-(meth)acryloyloxy butyric acid, an acrylic acid dimer, an itaconic acid, a maleic acid, and a maleic acid anhydride; glycidyl (meth)acrylate, (meth)acrylamide, N-vinyl pyrrolidone, or N-vinyl caprolactam may be used, but the present invention is not limited thereto. One or at least two of such monomers may be included in the polymer.

The acrylic polymer may further include another comonomer in a polymerized form when needed, and may be, for example, a monomer represented by Formula 1.

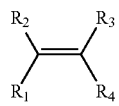

[Formula 1]

In Formula 1, $R_1$ to $R_3$ are each independently hydrogen or alkyl, $R_4$ is cyano; phenyl unsubstituted or substituted with alkyl; acetyloxy; or $COR_5$, and here, $R_5$ is amino or glycidyloxy unsubstituted or substituted with alkyl or alkoxyalkyl.

In the definition of $R_1$ to $R_5$ in Formula 1, alkyl or alkoxy may be alkyl or alkoxy having 1 to 8 carbon atoms, and preferably, methyl, ethyl, methoxy, ethoxy, propoxy, or butoxy.

As a particular example of the monomer of Formula 1, vinyl ester of carboxylic acid such as (meth)acrylonitrile, N-methyl (meth)acrylamide, N-butoxy methyl (meth)acrylamide, styrene, methyl styrene, or vinyl acetate may be used, but the present invention is not limited thereto.

The acrylic polymer may be prepared by, for example, solution polymerization, photo polymerization, bulk polymerization, suspension polymerization, or emulsion polymerization.

A kind of a multifunctional crosslinking agent crosslinking the acrylic polymer in the pressure-sensitive adhesive layer is not particularly limited, and for example, a suitable crosslinking agent may be selected from known crosslinking agents such as an isocyanate crosslinking agent, an epoxy crosslinking agent, an aziridine crosslinking agent, a metal chelate crosslinking agent, and a photocrosslinking agent according to a kind of a crosslinkable functional group present in the polymer. Here, as an example of the isocyanate crosslinking agent, diisocyanate such as tolylene diisocyanate, xylene diisocyanate, diphenylmethane diisocyanate, hexamethylene diisocyanate, isoboron diisocyanate, tetramethylxylene diisocyanate, or naphthalene diisocyanate; or a reaction product between the diisocyanate and a polyol may be used, and here, the polyol may be trimethylolpropane. The epoxy crosslinking agent may be ethyleneglycol diglycidylether, triglycidylether, trimethylolpropane triglycidylether, N,N,N',N'-tetraglycidyl ethylenediamine, or glycerin diglycidylether, the aziridine crosslinking agent may be N,N'-toluene-2,4-bis(1-aziridinecarboxamide), N,N'-diphenylmethane-4,4'-bis(1-aziridinecarboxamide), triethylene melamine, bisisoprothaloyl-1-(2-methylaziridine), or tri-1-aziridinylphosphineoxide, and the metal chelate crosslinking agent may be a compound in which a polyvalent metal is coordinated to a compound such as acetyl acetone or acetoacetic acid ethyl. Here, the polyvalent metal may be aluminum, iron, zinc, tin, titanium, antimony, magnesium, or vanadium, and the photocrosslinking agent may be a multifunctional acrylate. Here, in consideration of the kind of the crosslinkable functional group included in the polymer, one or at least two crosslinking agents may be used.

In the pressure-sensitive adhesive layer, a weight ratio of the multifunctional crosslinking agent may be regulated in consideration of a desired hardness.

The above-described pressure-sensitive adhesive layer may be formed by coating a coating solution prepared by blending the acrylic polymer and a multifunctional crosslinking agent, and inducing a crosslinking reaction between the polymer and the multifunctional crosslinking agent under suitable conditions.

The pressure-sensitive adhesive layer may further include at least one additive selected from the group consisting of a coupling agent, a tackifier, an epoxy resin, a UV stabilizer, an antioxidant, a coloring agent, a reinforcing agent, a filler, a foaming agent, a surfactant, and a plasticizer without diminishing a desired effect.

A thickness of the pressure-sensitive adhesive layer may be suitably selected according to a applied use, for example, desired peeling strength or ability to form a three-dimensional shape, or a size of a gap to be filled, but is not particularly limited.

The tape may further include a release sheet attached to the pressure-sensitive adhesive layer to protect the pressure-sensitive adhesive layer before the tape is used.

In one example, the swelling tape may be a tape that can be deformed into a three-dimensional shape to fill a gap due to a strength generated by expanding the substrate film when the tape is attached to any one of the two objects forming the gap by means of the pressure-sensitive adhesive layer, for example, when the tape is in contact with a fluid, and a balance with a fixing strength of the pressure-sensitive adhesive layer.

FIG. 1 is a schematic diagram illustrating a process of filling a gap by deforming the swelling tape into a three-dimensional shape between gaps.

In one example, two objects separated by the gap may be respectively an electrode assembly of a battery, and a can encasing the assembly, but the present invention is not limited thereto. In this case, the tape is a thread tape for the electrode assembly, which may be used to prevent unwinding of the electrode assembly, and to fix the electrode assembly to an inside of the can.

As shown in FIG. 1, a swelling tape (101) is attached to one (104) of two objects (103 and 104) forming a gap by means of the pressure-sensitive adhesive layer. When the tape is attached to the object and a fluid is introduced between the gaps and is in contact with the substrate film of the swelling tape (101), the substrate film expands in the length direction. Here, since the substrate film expands when the tape (101) is fixed to the object (104) using a pressure-sensitive adhesive layer, a swelling tape (102) takes on a three-dimensional shape which allow it to fill the gap and fix the two objects (103 and 104) having the gap to each other when needed.

A size of the three-dimensional shape implemented by the swelling tape, that is, a width of the gap, may be 0.001 mm to 2.0 mm, 0.001 mm to 1.0 mm, or 0.01 mm to 0.5 mm. However, the size of the three-dimensional shape may be changed depending on a specific kind of the gap to which the swelling tape is applied, but the present invention is not particularly limited thereto. The size of the three-dimensional shape according to the size of a gap to which the swelling tape is applied may be suitably controlled by the width of the gap.

Another aspect of the present invention provides a method of filling a gap. The exemplary method may be a method of filling a gap formed by a first substrate and a second substrate spaced apart from the first substrate. The method may include, for example, attaching a pressure-sensitive adhesive layer of the swelling tape to the first or second substrate, and contacting a substrate film of the swelling tape with a fluid.

In this method, specific kinds and shapes of the first and second substrates forming a gap are not particularly limited. That is, a gap to be filled is formed between the first and second substrates, and any kind of substrate in which a fluid can be introduced to a gap may be used.

In addition, the shape of the substrate is not particularly limited, either, and for example, the substrate may be formed in a flat shape as shown in FIG. 1, a curved shape, or an irregular shape. In one example, a width of the gap formed by the first and second substrates may be, but is not limited to, 0.001 mm to 2.0 mm, 0.001 mm to 1.00 mm, or 0.01 mm to 0.5 mm.

As shown in FIG. 1, the method may be performed by forming a tape (102) having a three-dimensional shape by contacting the substrate film with a fluid to be expanded while the tape (101) is attached to any one of the first and second substrates (103 and 104) forming a gap by means of a pressure-sensitive adhesive layer.

In one example, either one of the first and second substrates used in the method is an electrode assembly for a battery, and the other is a can encasing the assembly. The fluid in contact with the tape may be an electrolyte included in the battery.

In this case, for example, the method may be performed by encasing the tape in a can after attaching it to the electrode assembly and injecting the electrolyte into the can.

A specific kind of the electrode assembly is not particularly limited, and may include all kinds of common assemblies used in the art. In one example, the electrode assembly may be an electrode assembly for a secondary battery, for example, an electrode assembly for a lithium secondary battery.

The swelling tape may be attached to include a finishing part of a circumferential surface of the electrode assembly, in which the outermost end of the separator is disposed, and to surround a circumferential surface. In addition, the swelling tape may be attached to cover at least 30% or more of the entire surface of the circumferential surface of the electrode assembly, and upper and lower ends of the circumferential surface of the electrode assembly may be attached to expose the assembly.

The kind of the can encasing the electrode assembly is not particularly limited, and for example, as a known kind in the art, a cylindrical can may be used.

In addition, here, the kind of the electrolyte, which is a fluid for deforming, for example, expanding the tape is not particularly limited, and an electrolyte known in the art is used according to the kind of a battery. For example, when the battery is a lithium secondary battery, the electrolyte may include, for example, a non-aqueous organic solvent and a lithium salt. Here, the lithium salt may be dissolved in the organic solvent to serve as a donor of lithium ions in the battery and to stimulate transport of the lithium ions between an anode and a cathode. The lithium salt may include one or at least two of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x}+1SO_2)(C_yF_{2y}+1SO_2)$ (where x and y are natural numbers), LiCl, LiI, and lithium bisoxalate borate as a supporting electrolyte. In the electrolyte, a concentration of the lithium salt may depend on its use, and usually, is changed in the range of 0.1 M to 2.0 M. In addition, the organic solvent serves as a medium in which ions involved in an electrochemical reaction of the battery can be transported, and may include, for example, one or at least two of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a linear, branched, or cyclic hydrocarbon group having 2 to 50 carbon atoms, which may be a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, gamma butyrolactone, sulfolane, valerolactone, decanolide, and mevalolactone, but the present invention is not limited thereto.

In the swelling tape, a pressure-sensitive adhesive layer is formed on one surface of the substrate film having a deformation characteristic, for example, an expansion characteristic as described above. Accordingly, the tape may be attached to the electrode assembly after the above-described method is applied, and thus the three-dimensional shape can be implemented. As a result, the tape can effectively fill a gap between the electrode assembly and an inner wall of the can, and fix the electrode assembly in place, thereby preventing movement and shaking of the electrode assembly.

In other words, the "three-dimensional shape" of the swelling tape is formed by interaction between a deforming strength of the substrate film and a peeling strength of the pressure-sensitive adhesive layer of the swelling tape in contact with the electrolyte, and may include all structures capable of tightly fixing the electrode assembly in the can.

FIG. 3 is an example battery manufactured by the above-described method, in which swelling tapes (51a and 51b) form a three-dimensional shape by an electrolyte, and an electrode assembly (53) is fixed to a can (52).

For example, as shown in the left diagram of FIG. 3, the swelling tape (51a) may be maintained in a flat shape in the operation of attaching the tape to the assembly (53) and inserting the assembly into the can (52). However, after a predetermined time passes since the assembly is in contact with the electrolyte inserted into the can (52), as shown in the right diagram of FIG. 3, the swelling tape (51b) may be deformed into a three-dimensional shape to fill a gap between the electrode assembly (53) and the can (52) and fix them in place.

Advantage Effects

A swelling tape according to the present invention is applied between gaps in which a fluid is present, thereby implementing a three-dimensional shape, and thus can be used to fill the gap and fix an object forming the gap as needed.

DESCRIPTION OF DRAWINGS

FIG. 1 is a diagram showing a process of forming a swelling tape in a three-dimensional shape.

FIG. 2 is a cross-sectional view of the swelling tape.

FIG. 3 is a diagram showing a process of forming the swelling tape in a three-dimensional shape in the manufacture of a battery.

MODE OF INVENTION

Hereinafter, a swelling tape will be described in detail with reference to Examples and Comparative Examples, but the scope of the swelling tape is not limited to the following Examples.

Hereinafter, in Examples and Comparative Examples, physical properties are evaluated by the following methods.

1. Evaluation of Ability of Swelling Tape to Form Three-Dimensional Shape

Batteries manufactured in the Examples and Comparative Examples were stored at room temperature for one day, disassembled to take an electrode assembly out from the battery, and a state of the swelling tape attached to the electrode assembly was evaluated, thereby evaluating ability to form a three-dimensional shape according to the following criteria.

<Criteria for Evaluating Ability to Form Three-Dimensional Shape>

○: three-dimensional shape of the swelling tape was observed

Δ: three-dimensional shape of the swelling tape was not observed x: three-dimensional shape of the swelling tape was not observed, and the tape had peeled off of the electrode assembly 2. Evaluation of Gap-Filling Ability (Electrode Assembly Movement Preventing Ability) of Swelling Tape Gap-filling ability of the swelling tape was evaluated by a method of evaluating a movement preventing characteristic of the electrode assembly. In this method, for example, a low vibration evaluating method and a low impact evaluating method were included. In the low vibration method, a method for a vibration test was according to the UN38.3 specification, and when the battery was cut-off after evaluation, it was determined as cutting-off of a terminal by movement. In the low impact evaluation method, when the battery was put into an octagonal cylinder, rotated, and cut-off after predetermined time passed, it was determined as cutting-off of a terminal by movement. The gap-filling ability of the swelling tape evaluated by the above-described method was evaluated according to the following criteria.

<Criteria for Evaluation of Gap-filling Ability>

○: power of the battery was measured after evaluation of low vibration and low impact Δ: power of the battery was measured after evaluation of low vibration and low impact, but a resistance increased by 10% or more x: power of the battery was not measured after evaluation of low vibration and low impact 3. Evaluation of hardness A shore A hardness of a substrate film was measured according to ASTM D 2240, and a shore D hardness was measured according to JIS K-7311.

EXAMPLE 1

Manufacture of Swelling Tape

A non-extensible film, which was a thermoplastic polyurethane (TPU) film manufactured with a mixture prepared by blending an aromatic isocyanate compound as an isocyanate compound, polyester polyol as a polyol compound, and butanediol as a chain extender in a weight ratio of 38:50:12, respectively, had a shore A hardness of 95A, a deformation rate (expansion rate) in a length direction of 18%, and a thickness of approximately 40 μm, and was used as a substrate film. As an acrylic pressure-sensitive adhesive layer including an acrylic pressure-sensitive adhesive resin crosslinked to one surface of the substrate film with an isocyanate crosslinking agent, a pressure-sensitive adhesive layer having a peeling strength with respect to a glass plate of 1,200 gf/25 mm and a thickness of 15 μm was formed, thereby manufacturing a swelling tape.

Manufacture of Electrode Assembly and Battery

The swelling tape was attached to cover an area of about 50% of a circumference of an electrode assembly (cross-sectional diameter: 17.2 mm) formed in a jelly roll type including a cathode, an anode, and a separator, and the assembly was inserted into a cylindrical can (cross-sectional diameter: 17.5 mm) Subsequently, a carbonate-based electrolyte was injected into the can and the can was sealed, thereby completing a battery.

EXAMPLE 2

Manufacture of Swelling Tape

A non-extensible film, which was a thermoplastic polyurethane (TPU) film manufactured with a mixture prepared by blending an aromatic isocyanate compound as an isocyanate compound, polyester polyol as a polyol compound, and butanediol as a chain extender in a weight ratio of 20:75:5, respectively, had a shore A hardness of 75A, a deformation rate (expansion rate) in a length direction of 19%, and a thickness of about 40 μm, and was used as a substrate film. As an acrylic pressure-sensitive adhesive layer including an acrylic pressure-sensitive adhesive resin crosslinked to one surface of the substrate film with an isocyanate crosslinking agent, a pressure-sensitive adhesive layer having a peeling strength with respect to a glass plate of 1,230 gf/25 mm and a thickness of 15 μm was formed, thereby manufacturing a swelling tape.

Manufacture of Electrode Assembly and Battery

The swelling tape was attached to cover an area of about 50% of a circumference of an electrode assembly (cross-sectional diameter: 17.2 mm) formed in a jelly roll type including a cathode, an anode, and a separator, and the assembly was inserted into a cylindrical can (cross-sectional diameter: 17.5 mm) Subsequently, a carbonate-based electrolyte was injected into the can and the can was sealed, thereby completing a battery.

EXAMPLE 3

Manufacture of Swelling Tape

A non-extensible film, which was a thermoplastic polyurethane (TPU) film manufactured with a mixture prepared by blending an aromatic isocyanate compound as an isocyanate compound, polyester polyol as a polyol compound, and butanediol as a chain extender in a weight ratio of 58:27:15, respectively, had a shore D hardness of 85D, a deformation rate (expansion rate) in a length direction of 10%, and a thickness of about 40 μm, and was used as a substrate film. As an acrylic pressure-sensitive adhesive layer including an acrylic pressure-sensitive adhesive resin crosslinked to one surface of the substrate film with an isocyanate crosslinking agent, a pressure-sensitive adhesive layer having a peeling strength with respect to a glass plate of 1,130 gf/25 mm and a thickness of 15 μm was formed, thereby manufacturing a swelling tape.

Manufacture of Electrode Assembly and Battery

The swelling tape was attached to cover an area of about 50% of a circumference of an electrode assembly (cross-sectional diameter: 17.2 mm) formed in a jelly roll type including a cathode, an anode, and a separator, and the assembly was inserted into a cylindrical can (cross-sectional diameter: 17.5 mm) Subsequently, a carbonate-based electrolyte was injected into the can and the can was sealed, thereby completing a battery.

EXAMPLE 4

Manufacture of Swelling Tape

A non-extensible film, which was a thermoplastic polyurethane (TPU) film manufactured with a mixture prepared by blending an aromatic isocyanate compound as an isocyanate compound, polyester polyol as a polyol compound, and butanediol as a chain extender in a weight ratio of 55:30:15, respectively, had a shore D hardness of 80D, a deformation rate (expansion rate) in a length direction of 11%, and a thickness of about 40 μm, and was used as a substrate film. As an acrylic pressure-sensitive adhesive layer including an acrylic pressure-sensitive adhesive resin crosslinked to one surface of the substrate film with an isocyanate crosslinking agent, a pressure-sensitive adhesive layer having a peeling strength with respect to a glass plate of 1,150 gf/25 mm and a thickness of 15 μm was formed, thereby manufacturing a swelling tape.

Manufacture of Electrode Assembly and Battery

The swelling tape was attached to cover an area of about 50% of a circumference of an electrode assembly (cross-sectional diameter: 17.2 mm) formed in a jelly roll type including a cathode, an anode, and a separator, and the assembly was inserted into a cylindrical can (cross-sectional diameter: 17.5 mm) Subsequently, a carbonate-based electrolyte was injected into the can and the can was sealed, thereby completing a battery.

EXAMPLE 5

Manufacture of Swelling Tape

A non-extensible film, which was a thermoplastic polyurethane (TPU) film manufactured with a mixture prepared by blending an aromatic isocyanate compound as an isocyanate compound, polyester polyol as a polyol compound, and butanediol as a chain extender in a weight ratio of 40:48:12, respectively, had a shore D hardness of 45D, a deformation rate (expansion rate) in a length direction of 14%, and a thickness of about 40 μm, and was used as a substrate film. As an acrylic pressure-sensitive adhesive layer including an acrylic pressure-sensitive adhesive resin crosslinked to one surface of the substrate film with an isocyanate crosslinking agent, a pressure-sensitive adhesive layer having a peeling strength with respect to a glass plate of 1,200 gf/25 mm and a thickness of 15 μm was formed, thereby manufacturing a swelling tape.

Manufacture of Electrode Assembly and Battery

The swelling tape was attached to cover an area of about 50% of a circumference of an electrode assembly (cross-sectional diameter: 17.2 mm) formed in a jelly roll type including a cathode, an anode, and a separator, and the assembly was inserted into a cylindrical can (cross-sectional diameter: 17.5 mm). Subsequently, a carbonate-based electrolyte was injected into the can and the can was sealed, thereby completing a battery.

COMPARATIVE EXAMPLE 1

Manufacture of Swelling Tape

A non-extensible film, which was a thermoplastic polyurethane (TPU) film manufactured with a mixture prepared by blending an aromatic isocyanate compound as an isocyanate compound, polyester polyol as a polyol compound, and butanediol as a chain extender in a weight ratio of 15:80:5, respectively, had a shore A hardness of 65A, a deformation rate (expansion rate) in a length direction of 30%, and a thickness of about 40 μm, and used as a substrate film. As an acrylic pressure-sensitive adhesive layer including an acrylic pressure-sensitive adhesive resin crosslinked to one surface of the substrate film with an isocyanate crosslinking agent, a pressure-sensitive adhesive layer having a peeling strength with respect to a glass plate of 1,300 gf/25 mm and a thickness of 15 μm was formed, thereby manufacturing a swelling tape.

Manufacture of Electrode Assembly and Battery

The swelling tape was attached to cover an area of about 50% of a circumference of an electrode assembly (cross-sectional diameter: 17.2 mm) formed in a jelly roll type including a cathode, an anode, and a separator, and the assembly was inserted into a cylindrical can (cross-sectional diameter: 17.5 mm) Subsequently, a carbonate-based electrolyte was injected into the can and the can was sealed, thereby completing a battery.

COMPARATIVE EXAMPLE 2

Manufacture of Swelling Tape

A non-extensible film, which was a thermoplastic polyurethane (TPU) film manufactured with a mixture prepared by blending an aromatic isocyanate compound as an isocyanate compound, polyester polyol as a polyol compound, and butanediol as a chain extender in a weight ratio of 32:58:10, respectively, had a shore D hardness of 35D, a deformation rate (expansion rate) in a length direction of 20%, and a thickness of about 40 μm, and used as a substrate film. As an acrylic pressure-sensitive adhesive layer including an acrylic pressure-sensitive adhesive resin crosslinked to one surface of the substrate film with an isocyanate crosslinking agent, a pressure-sensitive adhesive layer having a peeling strength with respect to a glass plate of 1,280 gf/25 mm and a thickness of 15 μm was formed, thereby manufacturing a swelling tape.

Manufacture of Electrode Assembly and Battery

The swelling tape was attached to cover an area of about 50% of a circumference of an electrode assembly (cross-sectional diameter: 17.2 mm) formed in a jelly roll type including a cathode, an anode, and a separator, and the assembly was inserted into a cylindrical can (cross-sectional diameter: 17.5 mm) Subsequently, a carbonate-based electrolyte was injected into the can and the can was sealed, thereby completing a battery.

Physical properties measured in Examples and Comparative Examples are summarized and listed in Table 1.

2: swelling tape
201: substrate film
202: pressure-sensitive adhesive layer
51a, 51b: swelling tape
52: can
53: electrode assembly

What is claimed is:

1. A battery, comprising:
    an electrode assembly having a circumferential surface;
    a can encasing the assembly, the can spaced apart from the circumferential surface by a gap;
    a swelling tape attached to the circumferential surface and disposed in the gap; and
    an electrolyte in contact with the assembly in the can,
    wherein the swelling tape fixes the electrode assembly to an inside of the can upon contact with the electrolyte, the swelling tape deformed into a three-dimensional shape upon contact with the electrolyte and extending into the gap to fix the electrode assembly to the inside of the can,
    wherein the swelling tape comprises:
    a substrate film having, prior to contact with the electrolyte, a shore A hardness according to ASTM D2240 of 70A or more, or a shore D hardness according to JIS K-7311 of 40D or more; and
    a pressure-sensitive adhesive layer on one surface of the substrate film, and in a direction parallel to a length direction of the substrate film,
    wherein the substrate film consists of thermoplastic polyurethane,
    wherein the thermoplastic polyurethane is a reaction product of a mixture of an isocyanate compound having at least two isocyanate groups, a polymer polyol compound, and a chain extender, and
    wherein a total content of the isocyanate compound and the extender in the mixture is 100 to 300 parts by weight, relative to 100 parts by weight of the polymer polyol compound.

TABLE 1

|  | Examples | | | | | Comparative Examples | |
| --- | --- | --- | --- | --- | --- | --- | --- |
|  | 1 | 2 | 3 | 4 | 5 | 1 | 2 |
| Shore A hardness | 95A | 75A | — | — | — | 65A | — |
| Shore D hardness | — | — | 85D | 80D | 45D | — | 35D |
| Three-dimensional shape implementing ability | ○ | ○ | ○ | ○ | ○ | ○ | ○ |
| Gap-filling ability (Movement preventing ability) | ○ | ○ | ○ | ○ | ○ | x | x |
| Deformation of film during peeling of tape | Not deformed | Not deformed | Not deformed | Not deformed | Not deformed | Tape was extended | Tape was extended |
| Movement preventing test performed to 10 samples | 0, failed | 1, failed | 0, failed | 0, failed | 0, failed | 5, failed | 4, failed | failed: wrinkles were generated on the film in evaluation of an unwinding property

EXPLANATION OF MARKS 103, 104: objects forming a gap
101: swelling tape before implementation of three-dimensional shape
102: swelling tape after implementation of three-dimensional shape 2. The battery of claim 1, wherein the isocyanate compound is an aromatic isocyanate compound, an alicyclic isocyanate compound, or an aliphatic isocyanate compound.

3. The battery of claim 1, wherein the polymer polyol compound is polyester polyol, polycarbonate polyol, polycaprolactame polyol, polybutadiene polyol, or polysulfide polyol.

4. The battery of claim 1, wherein the chain extender is a bifunctional hydroxyl compound, a trifunctional hydroxyl compound, a tetrafunctional hydroxyl compound, or a bifunctional amine compound.

5. The battery of claim 1, wherein the substrate film is deformed into a three-dimensional shape having a height of 0.001 mm to 2.00 mm in a direction perpendicular to a length direction upon contact with the electrolyte.

6. The battery of claim 1, wherein the pressure-sensitive adhesive layer comprises an acrylic pressure-sensitive adhesive, a urethane pressure-sensitive adhesive, an epoxy pressure-sensitive adhesive, a silicon pressure-sensitive adhesive, or a rubber pressure-sensitive adhesive.

7. The battery of claim 1, wherein the pressure-sensitive adhesive layer comprises an acrylic polymer crosslinked with a multifunctional crosslinking agent.

8. A method of filling a gap formed between an electrode assembly having a circumferential surface and a can encasing the electrode assembly, the can spaced apart from the circumferential surface by the gap, wherein the electrode assembly and the can are components of a battery, the method comprising:
    attaching a pressure-sensitive adhesive layer of a swelling tape to the circumferential surface of the electrode assembly; and
    contacting a substrate film of the swelling tape with an electrolyte to deform the swelling tape into a three-dimensional shape, the deformed swelling tape extending into the gap to fix the electrode assembly to an inside of the can,
wherein the swelling tape comprises:
a substrate film, prior to contact with the electrolyte, having a shore A hardness according to ASTM D2240 of 70A or more, or a shore D hardness according to JIS K-7311 of 40D or more; and
a pressure-sensitive adhesive layer on one surface of the substrate film, and in a direction parallel to a length direction of the substrate film,
wherein the substrate film consists of thermoplastic polyurethane,
wherein the thermoplastic polyurethane is a reaction product of a mixture of an isocyanate compound having at least two isocyante groups, a polymer polyol compound, and a chain extender, and
wherein a total content of the isocyanate compound and the extender in the mixture is 100 to 300 parts by weight, relative to 100 parts by weight of the polymer polyol compound.

9. The method of filling a gap of claim 8, wherein the gap has a width of 0.001 mm to 2.00 mm.

10. The battery of claim 1, wherein the electrolyte is a carbonate-based electrolyte.

* * * * *